(12) United States Patent
Suzuki

(10) Patent No.: US 8,467,405 B2
(45) Date of Patent: *Jun. 18, 2013

(54) PACKET FORWARDING EQUIPMENT

(75) Inventor: Shinsuke Suzuki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/619,783

(22) Filed: Nov. 17, 2009

(65) Prior Publication Data

US 2010/0061369 A1 Mar. 11, 2010

Related U.S. Application Data

(63) Continuation of application No. 10/607,060, filed on Jun. 27, 2003, now Pat. No. 7,623,517.

(30) Foreign Application Priority Data

Nov. 26, 2002 (JP) .................................. 2002-341666

(51) Int. Cl.
*H04J 3/26* (2006.01)
(52) U.S. Cl.
USPC ......................................... 370/432; 370/390
(58) Field of Classification Search
USPC ................................................. 370/432, 390
See application file for complete search history.

(56) References Cited

U.S. PATENT DOCUMENTS

| 6,597,703 | B1 | 7/2003 | Li et al. | |
|---|---|---|---|---|
| 7,061,880 | B2 | 6/2006 | Basilier | |
| 7,120,147 | B2 * | 10/2006 | Derango et al. | 370/390 |
| 7,623,517 | B2 * | 11/2009 | Suzuki | 370/390 |
| 2001/0034793 | A1 | 10/2001 | Madruga et al. | |
| 2001/0053156 | A1 * | 12/2001 | Higuchi et al. | 370/466 |
| 2002/0021697 | A1 | 2/2002 | Tsuchiya et al. | |
| 2002/0085506 | A1 | 7/2002 | Hundscheidt et al. | |
| 2003/0018715 | A1 * | 1/2003 | O'Neill | 709/204 |
| 2003/0039232 | A1 * | 2/2003 | Casati et al. | 370/337 |
| 2003/0079040 | A1 * | 4/2003 | Jain et al. | 709/238 |
| 2004/0022244 | A1 | 2/2004 | Boers et al. | |
| 2004/0088735 | A1 * | 5/2004 | Kristofek | 725/118 |
| 2008/0151808 | A1 * | 6/2008 | O'Neill | 370/312 |

FOREIGN PATENT DOCUMENTS

| JP | 11-068782 | 3/1999 |
|---|---|---|
| JP | 2002-064558 | 2/2002 |
| JP | 2002-118552 | 4/2002 |

OTHER PUBLICATIONS

Notification of Reasons for Refusal in Japanese Patent Application No. 2007-257044, dated Dec. 12, 2009.
Asaeda, "New Communication Architecture by Source Specific Multicast", Information Processing, Mar. 2002, vol. 43, No. 3, pp. 260-265.

(Continued)

*Primary Examiner* — Mark Rinehart
*Assistant Examiner* — Christopher R Crompton
(74) *Attorney, Agent, or Firm* — Brundidge & Stanger, P.C.

(57) ABSTRACT

In a multicast network which permits client nodes to join only a source-specific multicast group, when a multicast group join request is received from a client node provided with an any-source multicast management protocol, a multicast router translates the join request into a join request for a source-specific multicast group by applying a source server address of the multicast group searched from a multicast source address table on the basis of an address of an incoming line of the join request and the multicast group address designated in the join request.

2 Claims, 7 Drawing Sheets

OTHER PUBLICATIONS

Cisco Systems, Inc.: "Source-Specific Multicast with IGMPv3, IGMPv3 Lite, and URD feature module, Release 12.1(5)T", (http://www.cisco.com/univercd/cc/td/doc/product/software/ios121/121newft/121t/121t5/dtssm5t./htm.
Remote Authentication Dial in User Service (RADIUS).
Distance Vector Multicast Routing Protocol: RFC 1075.
Protocol Independent Multicast-Dense Mode: draft-ietf-pim-dm-new-v2-01.txt.
Protocol-Independent Multicast-Sparse Mode: RFC 2362.
Cisco Systems, Inc.: "Interdomain Multicast Solutions Using SSM", (http://www.cisco.com/univercd/cc/td/doc/cisintwk/intsolns/mcst_p2.pdf).
H. Holbrook, B. Cain, "Source Specific Multicast for IP", (http://www.watersprings.org/pub/id/draft-ietf-ssm-arch-01.txt).
Hitoshi Asaeda, "New Communication Architecture Using Source Specific Multicast", The French National Institute for Research in Computer Science and Control.
D. Estrin, et al "Protocol Independent Multicast-Sparse Mode (PIM-SM): Protocol Specification", Network Working Group Request for Comments: 2362, The Internet Society, Jun. 1998, pp. 1-4/59 and 1-56/59.
W. Fenner, "Internet Group Management Protocol, Version 2", Network Working Group Request for Comments: 2236, pp. 1-5/22.

* cited by examiner

PACKET FORWARDING EQUIPMENT

This application is a continuation application of U.S. application Ser. No. 10/607,060, filed Jun. 27, 2003, now U.S. Pat. No. 7,623,517, the entirety of which is incorporated herein by reference.

BACKGROUND OF THE INVENTION (1) Field of the Invention

The present invention relates to a multicast network in which a source server of a multicast packet is specified and, more particularly, to a technique for connecting a client node which does not have a function of designating a source server of a multicast packet to a multicast network.

(2) Description of the Related Art

Multicast is a technique of transmitting packets simultaneously to a plurality of destinations on the Internet. The multicast enables distribution of a large amount of information to a plurality of destinations with a smaller amount of packets as compared with the case of transmitting packets to respective destinations a plurality of times. Consequently, the multicast is particularly suitable for real-time multimedia communication requiring heavy traffic typified by streaming and a video conference.

However, a multicast network is not spread so much in today's world. One of the main reasons is complexity of multicast routing control. Although multicast routing protocols such as DVMRP (Distance Vector Multicast Routing Protocol: RFC 1075) and PIM-DM (Protocol Independent Multicast-Dense Mode: draft-ietf-pim-dm-new-v2-01.txt) are simple, multicast traffic flows also into segments which are the units constructing a network and do not need multicast traffic, so that the protocols have a drawback of low efficiency in a network utilization.

In operation of a multicast network, PIM-SM (Protocol Independent Multicast-Sparse Mode: RFC 2362) which overcomes the drawback is usually used. According to PIM-SM, multicast traffic is allowed to flow only to the minimum segments. However, since overhead for calculation of a multicast transmission tree is large, PIM-SM has problems such that the protocol is complicated. Therefore, it is difficult to carry out the protocol, and a load on a router is heavy (Asaeda, "New Communication Architecture by Source Specific Multicast", Information Processing, March, 2002, Vol. 43, No. 3, pp. 260-265).

One of promising techniques proposed to address the complexity is source-specific multicast. In conventional N-to-N multicast communication, a multicast receiving terminal transmits a request to join a multicast group. In the source-specific multicast, when a multicast receiving terminal sends a request to join a multicast group, it is necessary to designate the source address of a multicast packet. The designation of the multicast source address by the multicast packet receiving terminal aims at limiting a packet forwarding process to one-to-N multicast communication to make the multicast routing control simpler (draft-ietf-ssm-overview-00.txt). Considering that many of cases of applying multicast are streaming from a small number of servers, even if the packet forwarding process is limited to one-to-N communication, the user needs for multicast can be satisfied.

A principal difference between source-specific multicast routing control and conventional general multicast routing control is that, in the source-specific multicast routing control, when an end user terminal joins a multicast group, the address of a source server of a multicast packet have to be designated together with the address of the multicast group.

To join the source-specific multicast network, the end user terminal has to support a multicast group management protocol adapted to the source-specific type, for example, IGMPv3 (Internet Group Management Protocol Version 3) in IPv4 or MLDv2 (Multicast Listener Discovery Version 2) in IPv6.

However, at present, the number of terminals supporting IGMPv3 or MLDv2 is not large. Since the cost of IGMPv3 or MLDv2 is higher than that of a conventional any-source multicast group management protocol, these multicast group management protocols are estimated that the possibility of actual implementation to low cost terminals typified by network appliances are also low in future. Consequently, some techniques for accommodating terminals, each of which does not support IGMPv3 or MLDv2 as the source-specific multicast group management protocol, to a source-specific multicast network have been proposed.

For example, in IGMPv3 Lite of Cisco Systems, Inc., by implementing an IGMPv3 translation library having specified function in an application of an end user terminal, the end user terminal can join a source-specific multicast network via the translation library even when the application of the end user terminal does not actually support IGMPv3. In URD (URL Rendezvous Discovery) of Cisco Systems, Inc., the end user designates the address of a multicast source server to a router with HTTP (Hyper Text Transfer Protocol), so that a request to join a source-specific multicast network can be notified to the router even when the end user terminal and application do not support IGMPv3.

Except for those conventional techniques, by allowing a router itself to make a line to statically join a multicast group including a specified multicast source, multicast traffic from the specified source can be flowed to the line even when an end user terminal on the line does not support IGMPv3 (Cisco Systems, Inc.: "Source-Specific Multicast with IGMPv3, IGMPv3 Lite, and URD feature module, Release 12.1(5)T", http://www.cisco.com/univercd/cc/td/doc/product/software/ios121/121newft/121t/121t5/dtssm5t.htm).

One of advantages of the source-specific multicast is that by permitting only a multicast transmission from a specific source, network resources can be prevented from being wasted by multicast transmission from an unspecified source. As one of proposals for improving the source-specific multicast from such a viewpoint, there is multicast routing protocol (draft-lehtonen-magma-mcop-00.txt) proposed by Lehtonen of Sonera Corp.

In this system, upon receiving a request to join source-specific multicast, a multicast forwarding equipment inquires a multicast control server of whether joining is possible or not, so that the multicast control server can manage the filtering of requests to join the source-specific multicast.

SUMMARY OF THE INVENTION

The conventional techniques for connecting a terminal, which is not adapted to source-specific multicast, to a source-specific multicast network have the following two problems.

The first problem is that a computer or an application on the end user side cannot adapt to the source-specific multicast unless it is modified. The above-described IGMPv3 Lite and URD have this drawback. Specifically, in the case of IGMPv3 Lite, an application has to be reconstructed by using a translation library. In the case of URD, separately from the application, the user has to take a procedure of joining the source-specific multicast network. Consequently, it requires much trouble to the user than joining to an any-source-multicast network.

In the case where a router itself makes a terminal on a specific line statically join to multicast, the first problem does not occur. However, in this case, even when there is no multicast participant actually, multicast traffic flows into the specific line statically joined the multicast group by the router. Consequently, there is a second problem such as occurrence of congestion caused by wasting a bandwidth on the specific line and unnecessary line cost to the user.

An object of the invention is to solve both of the above two problems simultaneously. Specifically, an object to be achieved by the invention is to enable an end user terminal adapted only to any-source multicast to dynamically join or leave a source-specific multicast network without changing the terminal function.

To achieve the object, according to the invention, an any-source multicast group join request sent from a client node to a router is translated into a source-specific-multicast group join request. For the translation, a multicast source address table is used. In the management table, the correspondence relations among the router, a multicast group address, a source node of a multicast group management packet, and a multicast packet source server are managed. The management table is similar to a management table used in multicast control protocol.

By using the management table, each router to which end user terminals (client nodes) are connected translates an any-source multicast group join request into a request to join a source-specific multicast group in which the source of a multicast packet is limited to a specific server permitted by a network administrator.

Also when the router inquires a line of whether a client node joining a source-specific multicast group exists or not, the router inquires of the presence or absence of a client node joining the group in an any-source multicast format after searching the management table to determine that the client node on the line is permitted to join a multicast group in which a multicast source is specified.

A feature of the invention resides in that packet forwarding equipment to which a multicast client node is connected performs processing of a request to join or leave a multicast group received from the multicast client node, which does not have the function of designating a multicast source address, after translating the request into a request to join or leave a source-specific multicast group requiring designation of a multicast source address. The packet forwarding equipment can determine a multicast source address to be designated on the basis of an address of the multicast client node and an address of the multicast group to which the join or leave request has been sent.

More specifically, the packet forwarding equipment according to the invention has a table for indicating the relation of a multicast group address, a multicast client node address, and a multicast source address. When a request to join or leave a multicast group is issued from a multicast client node which does not have a function of designating a multicast source address, the packet forwarding equipment searches the table for an entry including the address of the multicast client node which has issued the join or leave request and the address of the multicast group to which the join or leave request has been sent, and designates a multicast source by using a multicast source address indicated in the retrieved entry.

When the multicast source address of the entry retrieved from the table is "don't care", the request may be treated as a request to join or leave an any-source multicast group which does not designate a multicast source. The table is installed either in the packet forwarding equipment or in a different apparatus which can be accessed by the packet forwarding equipment via a line.

Another feature of the invention resides in that packet forwarding equipment to which multicast client nodes are connected is enabled to detect whether a multicast client node joining a source-specific multicast group requiring designation of a multicast source exists on a network or not even in the case where the multicast client node does not have a function of responding to a source-specific multicast join query. In this configuration, by searching a table indicating relations among a multicast group address, a multicast client node address, and a multicast source address, whether or not a multicast client node joining a source-specific multicast group exists in a network is detected.

Another feature of the invention resides in that the packet forwarding equipment to which multicast client nodes are connected is provided with a management table for managing the correspondence relation among a multicast group, an address of a node serving as a client of the multicast group, and an address of a multicast source in the multicast group, and an any-source multicast group join request is translated into a source-specific multicast group join request by using the management table.

Another feature of the invention is a method of translating an any-source multicast group join request to a source-specific multicast group join request. More concretely, with reference to a multicast source address table on the basis of multicast group address included in a multicast group join request sent from a node, which supports any-source multicast only, and a line to which the join request is issued, a multicast source server in a multicast network permitted by a network administrator is specified.

A multicast router translates a request to join an any-source multicast group into a request to join a multicast group in which a specific source server permitted by a network administrator multicasts packets. When the multicast router periodically checks whether a client node joining the multicast group specifying the source server exits in a network or not, the address of the multicast source server in the multicast network permitted by the network administrator is retrieved from the multicast source address table on the basis of the multicast group address and the line on which the join request is issued.

When the source server address retrieved from the multicast source address table does not match the address of a specific source server in a multicast group to be checked, the multicast router judges that a client node joining the multicast of the source server does not exist on the line.

In the case where the source server address retrieved from the multicast source address table matches the address of a specific source server in a multicast group, the multicast router checks whether a client node joining the multicast group exists on the line or not without designating a multicast source server in a manner similar to the conventional technique. Depending on whether a node joining the multicast group is found or not at this occasion, whether a node joining the multicast group in which the specific source server multicast packets exists on the line or not is determined.

Another feature of the invention resides in a request translation method for a network including a multicast client, multicast forwarding equipment to which the multicast client is connected, and a table indicative of a relation of a multicast group address, an address of the multicast client, and a multicast source address, wherein when a request to join the multicast group is issued from the multicast client without designating multicast source address, the multicast forwarding equipment retrieves, from the multicast source address table, the multicast source address corresponding to the address of the multicast client indicated in the join request and the multicast group address, thereby translating the multicast group join request having no designation of the multicast source into a multicast group join request having designation of the multicast source address.

Further another feature of the invention resides in a address retrieval method for a network including a multicast client, a multicast forwarding equipment to which the multicast client is connected, and a table indicative of a relation of a multicast group address, an address of the multicast client, and a multicast source address, wherein when a query to join the multicast group specifying multicast source address is issued in an interface of the multicast forwarding equipment, the multicast source address corresponding to the multicast group defined by the network administrator is retrieved with reference to the multicast source address table based on the address of the interface.

The scope of the invention also includes a network system realizing the above described methods and a network system to which the above described packet forwarding equipment is applied.

DESCRIPTION OF THE PREFERRED EMBODIMENTS

Embodiments of the invention will be described concretely hereinbelow.

Figure 1:
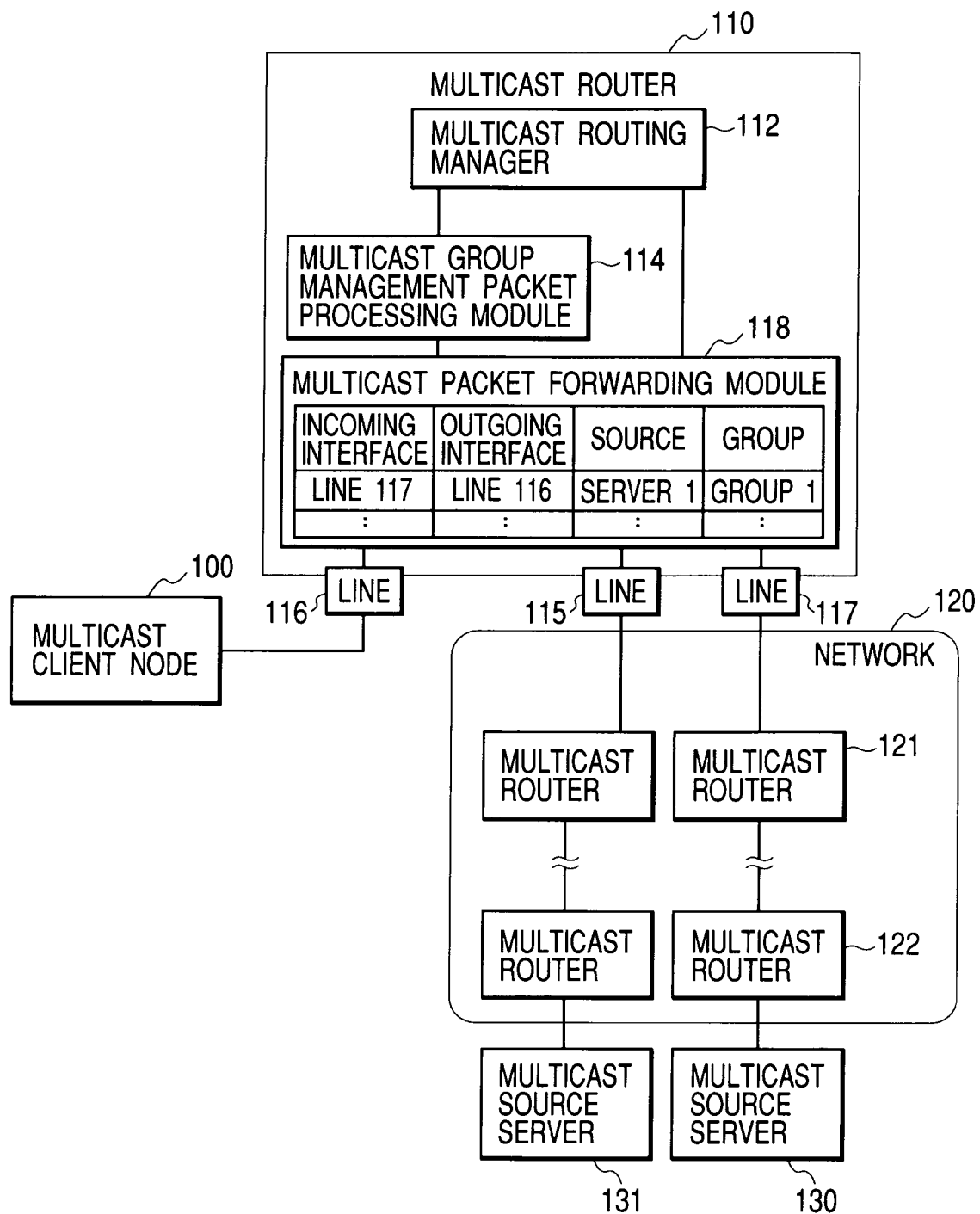
FIG. 1 is a block diagram showing a whole image of multicast routing to which the invention is applied.
Figure 2:
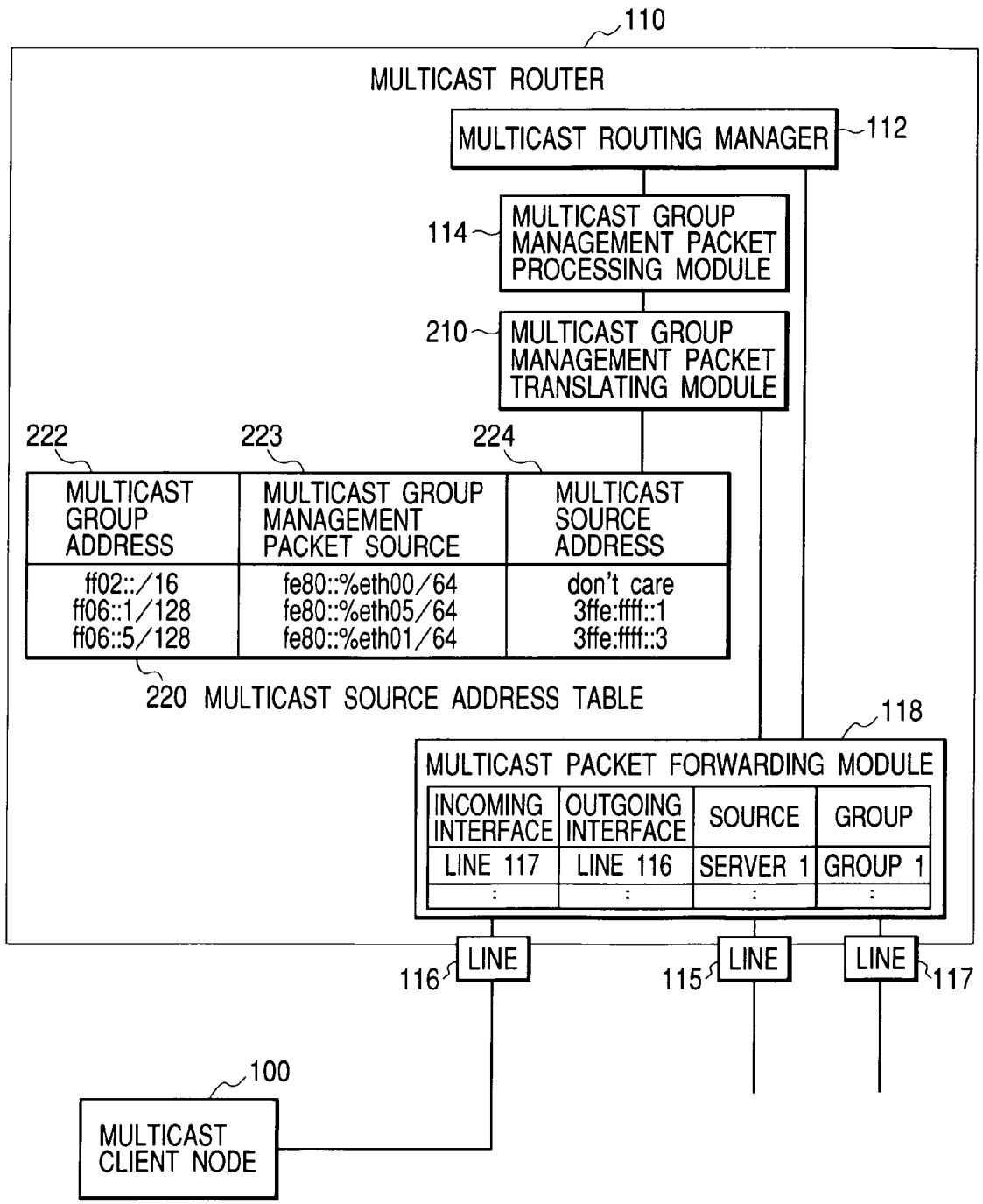
FIG. 2 is a block diagram showing a whole source-specific multicast routing translating module to which the invention is applied.
Figure 3:
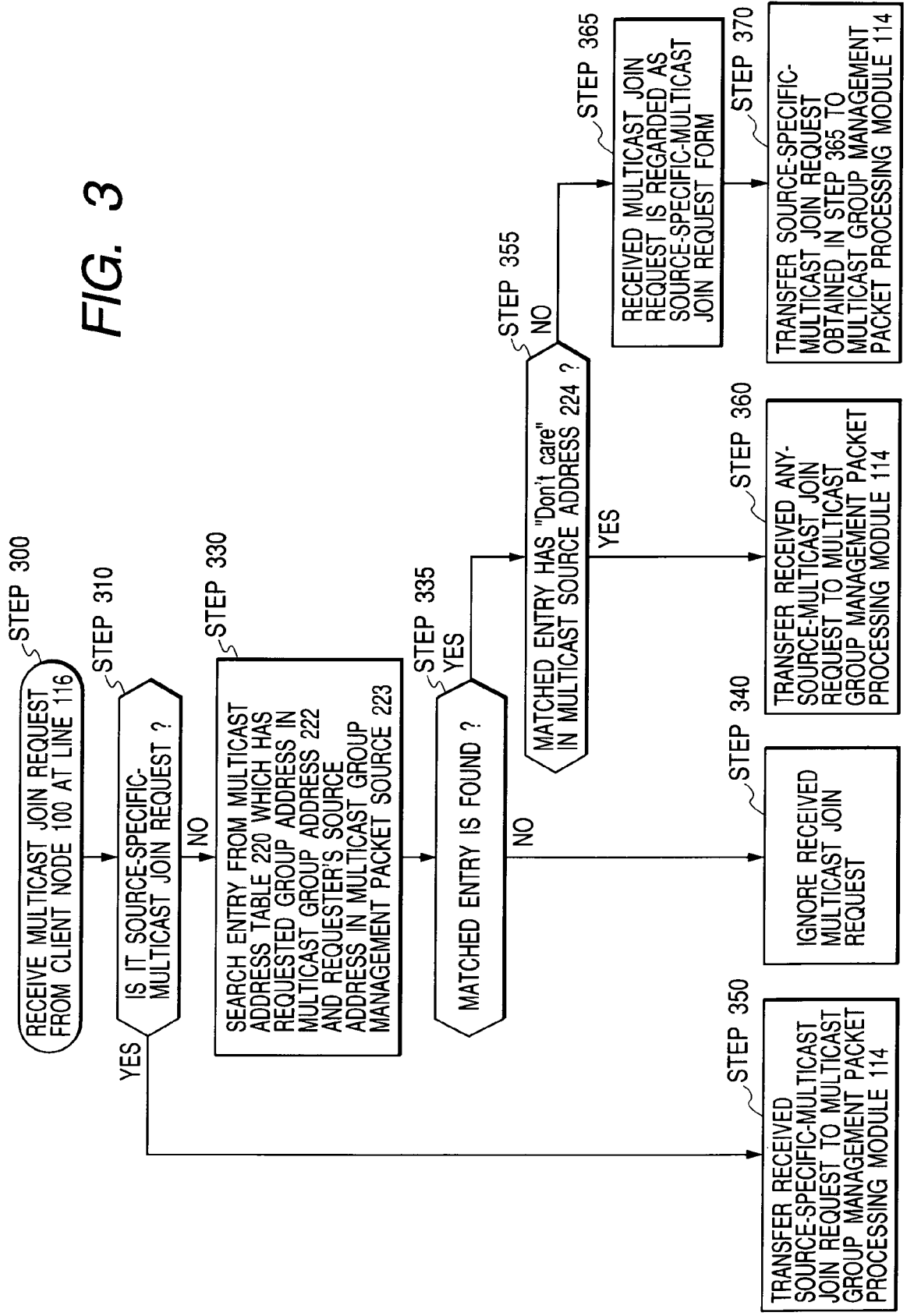
FIG. 3 is a flowchart showing a method of translating an any-source-multicast join request into a join request to a multicast group in which a multicast source is limited to a source server permitted by a network administrator, executed by an input/output interface of a multicast join or leave request in a multicast router.
Figure 4:
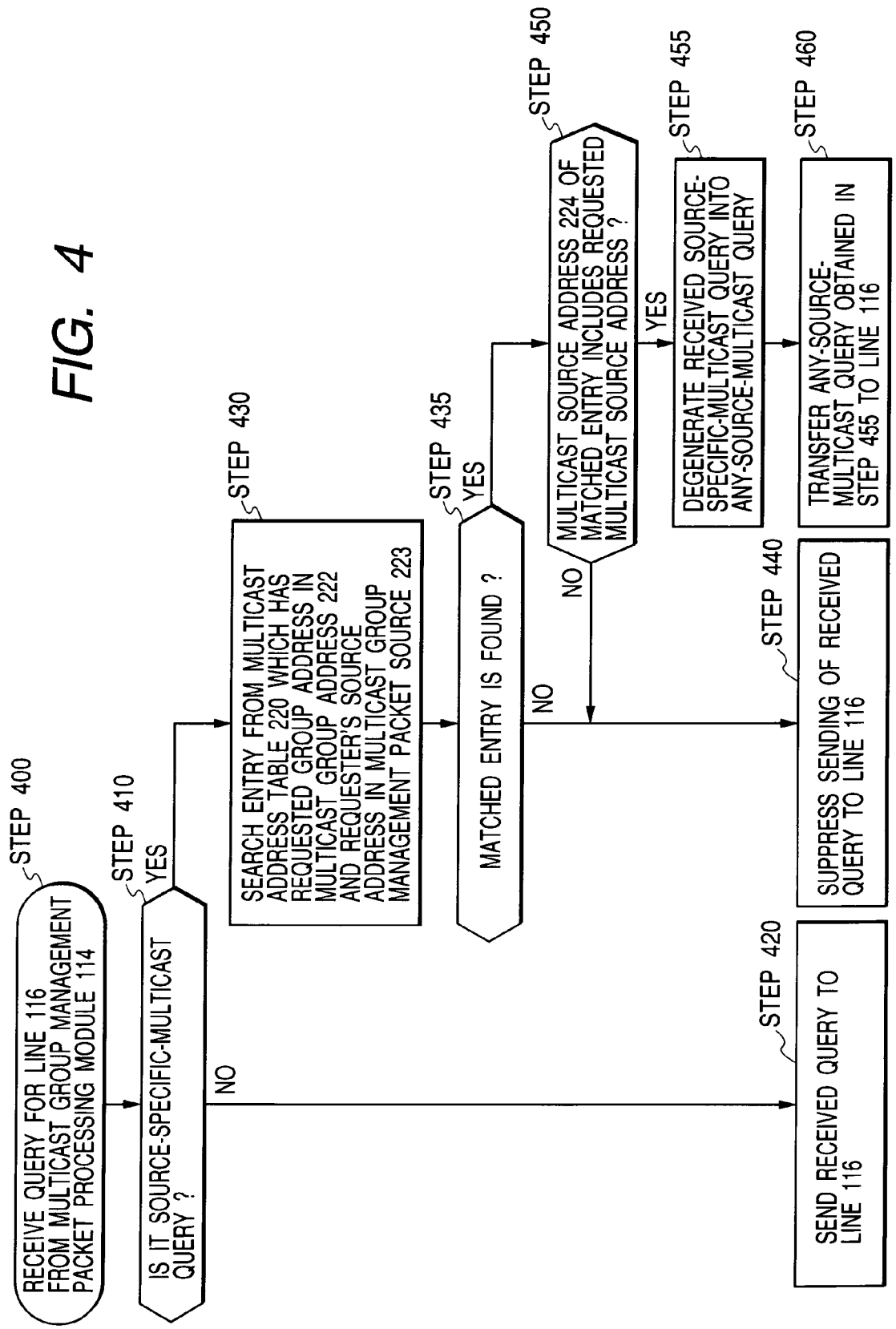
FIG. 4 is a flowchart showing a method of translating a query from a source-specific-multicast join terminal to a query of an any-source-multicast group join terminal, executed by the incoming and outgoing interface of a multicast join or leave request in the multicast router.
Figure 5:
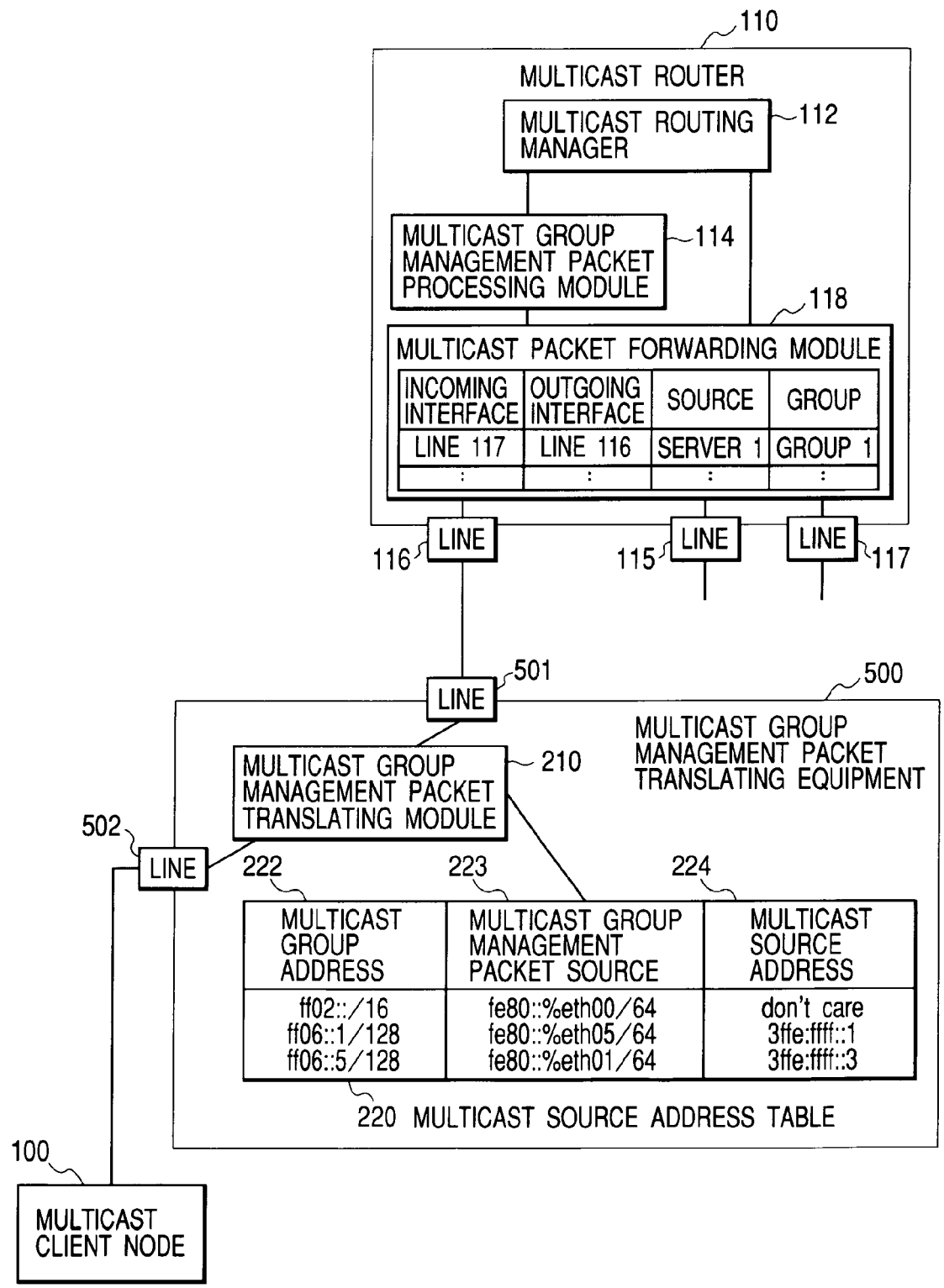
FIG. 5 is a block diagram showing a whole system as another embodiment of the invention in which the input/output interface of a multicast join or leave request is placed on the outside of the router.
Figure 6:
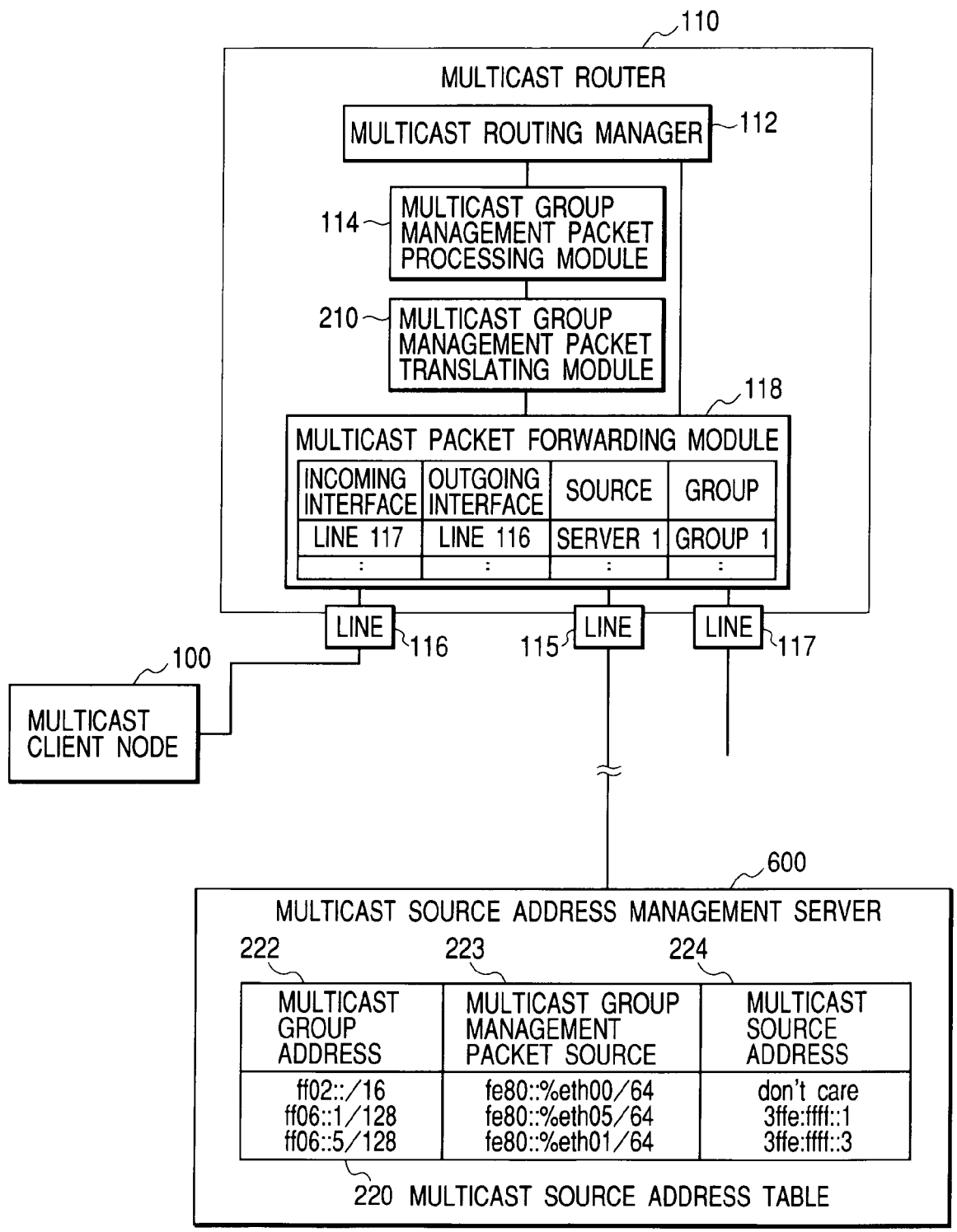
FIG. 6 is a block diagram showing a whole system as another embodiment of the invention in which a multicast source server management table is placed on the outside of the router.
Figure 7:
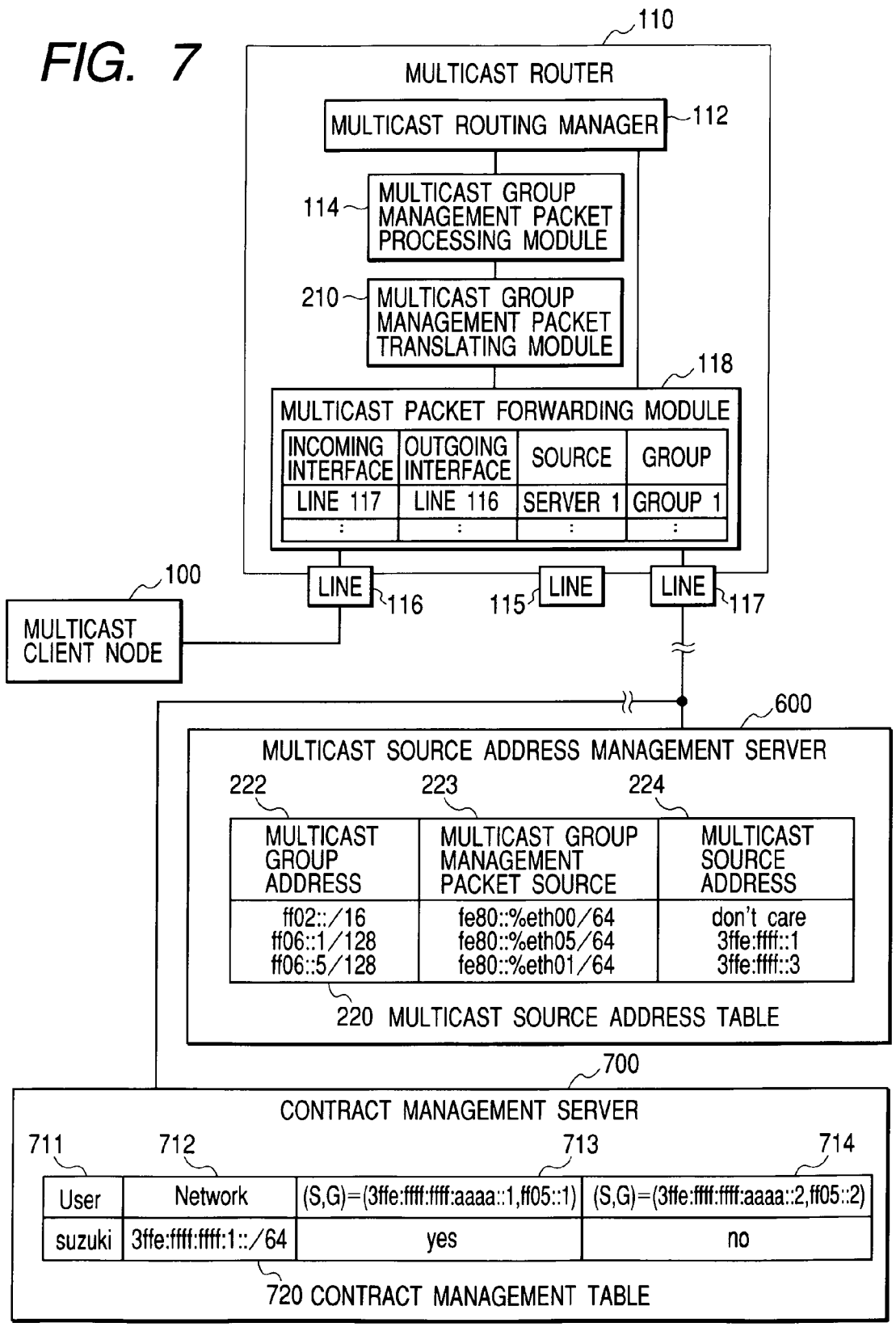
FIG. 7 is a block diagram showing a whole system as an embodiment of automatically updating the multicast source server management table according to a request from the user.

FIG. 1 shows a whole image of source-specific multicast routing to which the invention is applied. FIG. 2 is a block diagram showing a whole source-specific multicast routing translating module to which the invention is applied. FIG. 3 is a flowchart showing a method of translating a request to join an any-source-multicast group to a request to join a source-specific multicast group in which a multicast source is limited to a source server permitted by a network administrator, executed by an edge router in a position at which client nodes are connected to a multicast network. FIG. 4 is a flowchart showing a method of translating a query of a source-specific-multicast join terminal to a query of an any-source-multicast group join terminal. With reference to FIGS. 5, 6, and 7, other embodiments of the invention will be introduced.

First, a method of realizing common multicast communication will be described with reference to FIG. 1. At the time of joining a multicast group, a multicast client node (terminal) 100 transmits a request to join a multicast group to a multicast router 110 in a position of directly accommodating the node 100. In the case of conventional any-source-multicast, a multicast group management protocol such as IGMPv2 or MLDv1 is applied. In the case of source-specific-multicast, a multicast group management protocol such as IGMPv3 or MLDv2 is applied.

In the multicast router 110, the request to join the multicast group is received by a multicast group management packet processing module 114 via a line 116. The multicast group management packet processing module 114 notifies a multicast routing manager 112 of the received multicast join request.

The multicast routing manager 112 notifies the multicast join request to a multicast router 121, which exists in the direction toward a packet source in the multicast group the multicast client node 100 wishes to join, among neighboring multicast routers. In the case of source-specific multicast, the multicast router 121 corresponds to a next-hop router to reach a preliminarily designated source address by unicast. In the case of any-source-multicast, the multicast router 121 corresponds to a next-hop router used to reach an address called a rendezvous point defined by the network administrator in correspondence with a group address. For notification of a request to join (or leave) a multicast group between the routers, multicast routing protocol such as PIM-SM is used.

Simultaneously with the notification of the multicast join request to the multicast router 121, the multicast routing manager 112 adds to a multicast packet forwarding module 118 a control parameter setting for forwarding a packet addressed to the multicast group (in the case of the source-specific multicast, further, a condition that the source of the packet being a pre-designated source is checked) received from the router 121 to the line 116 connected to the multicast client node 100.

By repeating the notifying operation and the addition of control parameter setting for packet forwarding, all of multicast routers located between the multicast client node 100 and a source node (or server) of the multicast packet can know the multicast routing information.

In the case of the any-source-multicast, only a multicast router existing between the multicast client node 100 and a multicast router as a rendezvous point knows the multicast routing information. A multicast router located between the rendezvous point and the multicast packet source node does not always know the multicast routing information. However, this case is based on the premise that all of routers know the location of the rendezvous point and the multicast packet from the source node can always reach the rendezvous point corresponding to the multicast group. Consequently, all of routers between the source node and a receiving node can know the multicast routing information finally. Accordingly, when a multicast source server 130 in a multicast network 120 communicates with the multicast group, this communication reaches the multicast client node 100 via multicast routers 122, 121 and 110.

The multicast group management packet processing module 114 in the multicast router 110 periodically inquires the line 116, on which the multicast client node 100 exists, of the presence or absence of a node which joins the multicast group, in order to grasp whether the multicast client node 100 is joining the multicast group or not. In the case where the multicast client node 100 joins the multicast group, the multicast client node 100 sends back a request to join the multicast group in response to the query.

In the case of the source-specific multicast, the protocol used for the above communication is IGMPv3 or MLDv2. In the case of the any-source-multicast, the protocol is IGMPv2 or MLDv1. After the multicast client node 100 leaves the multicast group, nothing is sent in response to the query.

When the multicast join request is not received by the line 116 for predetermined time, the multicast router 110 judges that a multicast client node joining the multicast group does not exist on the line 116, and sends a request to leave the multicast group to the multicast router 121 neighboring in the direction of transmission source of the multicast packet by using a multicast routing protocol such as PIM-SM. At this time, the multicast routing manager 112 deletes, from the multicast packet forwarding module 118, the control parameter setting for forwarding a packet (in the case of the source-specific multicast, a packet sent from a designated source) addressed to the multicast group and received from the router 121 to a network in which the multicast client node 100 exists.

By repeating the operation of notifying of the leave request and deletion of parameter setting for packet forwarding, the lapse of routing information for the multicast group in the edge router 110 is propagated to all of the multicast routers in the network 120. As a result, even if the multicast source server 130 sends a packet to the multicast group, the packet does not reach the multicast client node 100.

In the any-source-multicast, the join request or leave request notified from the multicast client node 100 to the whole network 120 via the multicast router 110 designates merely the address of the multicast group as an object of join or leave.

On the other hand, in the source-specific-multicast, the join request sent from the multicast client node 100 designates a pair of the address of the multicast source server 130 and the multicast group address. Consequently, in the case of the source-specific-multicast, the routing control in the network 120 can be realized so that only traffic from the multicast source server 130 designated by the join request reaches the multicast client node 100 as a requester.

In the case of the any-source-multicast, traffic to the designated multicast address sent from a multicast source server 131 which is not designated by the join request can reach the multicast client node 100 in a manner similar to traffic from the designated multicast source server 130.

On the other hand, in the source-specific-multicast, a multicast packet from the multicast source server 131 which is not designated by the multicast client node 100 does not reach the multicast client node 100 since parameter setting for forwarding the multicast packet does not exist in the network 120. That is, the routing control is performed so that when traffic having the same multicast address is received, if the source server is different from the designated source server, the traffic is prevented from reaching the client which has sent the join request.

To realize the source-specific-multicast, in both of communication between the multicast client node 100 and the multicast router 110 and communication between the multicast router 110 and the neighboring multicast router 122, the pair of the multicast source server address and the multicast group address has to be notified. Between the routers 110 and 122, designation information of the multicast source server can be communicated by using, for example, the existing multicast control protocol PIM-SM (Protocol Independent Multicast Sparse Mode) specified in IETF RFC 2362.

Although the multicast group management protocol is used for communication between the multicast client node 100 and the multicast router 110, as described in the related art, all of client nodes do not necessarily support the multicast group management protocol capable of designating a multicast source server address. Therefore, it is an issue to achieve a method of managing the multicast group between the multicast client node 100 and the multicast router 110 in order to realize the source-specific-multicast.

In IGMPv2 or MLDv1 applied to the multicast group management between the multicast client node 100 and the multicast router 110, three kinds of management packets of a request to join the multicast group ("Join"), a query of join ("Query"), and a leave request ("Leave") are defined and used in the above-described manner. Therefore, when the multicast client node 100 does not have the function of designating the address of the multicast source server, it is sufficient for the multicast router 100 to translate management packets of the any-source-multicast group into management packets for the source-specific-multicast with respect to the above three kinds of management packets. The method of translating the three kinds of management packets will be described hereinbelow.

Referring to FIG. 2, a method of translating the join request (Join) and the leave request (Leave) for the any-source-multicast into management packets for source-specific-multicast in accordance with the invention will be described.

A multicast source address table 220 manages the correspondence relations among multicast group address 222, a multicast group management packet (Join or Leave request) source 223, and a multicast source address 224. In the embodiment, it is assumed that proper parameter setting is preliminarily made in each of entries in the multicast source address table 220 by the router administrator.

Referring to FIG. 3, a method of translating an any-source-multicast join request received from the line 116 into a source-specific-multicast join request carried out by a multicast group management packet translating module 210 in the multicast router 110 will be described.

When a multicast join request packet is received from the multicast client node 100 (step 300), the multicast group management packet translating module 210 determines whether the received request packet is the source-specific-multicast join request packet or the any-source-multicast join request packet (step 310). In the case where the received packet is IGMP of IPv4 or MLD of IPv6, it is able to discriminate whether the received packet is of a source-specific type or an any-source type, concretely, on the basis of the packet length.

When the received packet is of the source-specific type, the multicast group management packet translating module 210 transfers the received source-specific-multicast join request packet as it is to the multicast group management packet processing module 114 (step 350).

When the received packet is not of the source-specific type, the multicast group management packet translating module 210 searches the multicast source address table 220 for an entry having the multicast group management packet source 223 and the multicast group address 222 matching the source address (the address of the multicast client node 100) of the multicast join request packet and the multicast group address designated in the multicast join request packet (step 330).

When an entry matching the join request does not exist in the multicast source address table 220, it means that the multicast group join request from the multicast client node 100 is refused by the network administrator, so that the multicast group management packet translating module 210 ignores the join request (step 340).

When an entry matching the join request exists in the multicast source address table 220, the multicast group management packet translating module 210 checks the contents of the multicast source address 224 of the retrieved entry. If the contents of the multicast source address 224 is "don't care", it means that the multicast group join request is to be processed as the request of the any-source type. In this case, the received packet is transferred as it is to the multicast group management packet processing module 114 (step 360).

In the case where the contents of the multicast source address 224 is other than "don't care", the multicast group management packet translating module 210 judges that the received request is the request to join the multicast group requiring the designation of a source server (source address) indicated by the entry retrieved in step 330, translates the join request into a multicast group join request of the source-specific type (step 365), and transfers the resultant request to the multicast group management packet processing module 114 (step 370). The multicast group management packet processing module 114 in the multicast router 110 translates the multicast leave request of the any-source type received from the line 116 into a leave request of the source-specific type by the same method as the above described flowchart.

With reference to FIG. 4, a method of translating a source-specific multicast join query (Query) issued by the multicast routing manager 112 into an any-source multicast join query carried out by the multicast group management packet translating module 210 in the multicast router 110 will be described.

When a multicast join query packet to be sent to the line 116 is received from the multicast routing manager 112 via the multicast group management packet processing module 114 (step 400), the multicast group management packet translating module 210 determines whether the received query packet is a source-specific type multicast join query or an any-source type multicast join query (step 410).

If the received query packet is of the any-source type, the multicast group management packet translating module 210 transfers the multicast join query packet as it is to the designated line 116 (step 420). If the received query packet is of the source-specific type, the multicast source address table 220 is searched for an entry having the multicast group address 222 and the multicast group management packet source 223 matching the multicast group address included in the query packet and the address of the line 116 to which the query packet is to be sent (step 430).

When an entry matching the query packet does not exist in the multicast source address table 220, it means that operation of the multicast group is refused by the network administrator. In this case, the multicast group management packet translating module 210 does not transmit the join query packet to the line 116 (step 440).

When an entry matching the query packet exists in the multicast source address table 220, the multicast group management packet translating module 210 checks whether the address indicated by the multicast source address 224 of the entry includes the multicast source address indicated in the source-specific type multicast join query packet or not (step 450).

If the multicast source address is not included in the address of the multicast source address 224, it means that the request to join the multicast is refused by the network administrator. Therefore, the multicast group management packet translating module 210 does not transmit the join query packet to the line 116 (step 440).

If the multicast source address is included in the address of the multicast source address 224, it means that the multicast source address is permitted by the network administrator. Therefore, the multicast group management packet translating module 210 translates the source-specific multicast join query packet into an any-source multicast join query packet having the multicast group address (step 455) and transmits the resultant packet to the line 116 (step 460).

As described above, in the invention, since the multicast group management packet processing module 114 of the multicast router 110 translates the any-source multicast group management packet to the source-specific multicast group management packet, it appears for the multicast routing manager 112 of the multicast router 110 that a client node supporting the source-specific multicast exists on the line 116.

According to the invention, therefore, it is unnecessary to change the routing control between the multicast router 110 and the neighboring multicast router 122. In the multicast network 120, an element to be changed in order to realize the invention is only the multicast router 110 to which the multicast client node 100 is connected.

In the invention, since a client node does not support the source-specific multicast group management protocol, the user cannot choose an arbitrary multicast source server. With respect to this point, the translating technique does not perfectly translate an any-source multicast node to a source-specific multicast node. However, as described in the related art, the source-specific multicast is directed to multicast communication from a small number of servers such as a streaming server, and the streaming server is operated generally by a network administrator. Consequently, even if the user cannot freely choose the multicast source server, a problem hardly occurs in actual operation.

Referring now to FIGS. 5, 6, and 7, other embodiments of the invention will be described.

In the embodiment of FIG. 2, the function of the multicast group management packet translating module 210 is installed in the multicast router 110.

FIG. 5 shows an embodiment in which the function of the multicast group management packet translating module 210 is provided on the outside of the multicast router 110, specifically, in a multicast group management packet translation equipment 500 disposed between the multicast client node 100 and the multicast router 110. In this case, the multicast group management packet translation equipment 500 passes received packets other than the multicast group management packet so as to be communicated between the multicast client node 100 and the multicast router 110.

When a multicast management packet is received from a line 501 (or 502), the multicast group management packet translating module 210 translates the received packet according to processes described below, and output the resultant packet to the line 502 (or 501). Specifically, the multicast group management packet translating module 210 functions as protocol translation equipment for translating an any-source type multicast join request packet and a leave request packet received from the multicast client node 100 into request packets adapted to source-specific multicast according to the procedure of FIG. 3, transferring the resultant packets to the multicast router 110, translating source-specific type multicast join or leave query packets input from the multicast router 110 into query packets adapted to any-source multicast according to the procedure of FIG. 4, and transferring the resultant packets to the multicast client node 100.

The embodiments of FIGS. 2 and 5 are based on the premise that the multicast group management packet translating module 210 has the multicast source address table 220. FIG. 6 shows an embodiment in which the multicast source address table 220 is provided apart from the multicast group management packet translating module 210.

When the searching process of the multicast source address table 220 is carried out by the processing routines of FIGS. 3 and 4, in the embodiments of FIGS. 2 and 5, the internal table 220 is referred to. In the embodiment of FIG. 6, the multicast router 110 sends a query to a multicast source address management server 600 having the multicast source address table 220 via a network, thereby to perform a search similar to the above.

According to this embodiment, the multicast source address table required by the multicast routers can be managed in a centralized manner by the multicast source address management server 600. In this case, each multicast router searches an entry from the multicast source address table 220 by sending a query to the management server 600. It is sufficient to use, as a communication protocol applied to a query to the management server 600, an existing network database search protocol such as "Radius" (RFC2865).

FIG. 7 is a diagram showing a whole system of an embodiment of automatically updating the multicast source address table 220 according to a request from the user. In the embodiments of FIGS. 2, 5, and 6, it is assumed that entries of the multicast source address table 220 are set by the network administrator. By realizing the invention with the system configuration of FIG. 7, setting of entry data into the multicast source address table 220 can be semi-automated.

Generally, in the case of multicasting onerous contents, for example, subscription of onerous contents has to be managed for each user by a contract management server 700. In a contract management table 720 managed by the contract management server 700, a correspondence relation between user network information 711 and a subscribed session (combination of a source server and a multicast group address) 712 is registered.

By reflecting the contents of the contract management table 720 to the multicast source address management server 600 via a network, the contents of the multicast source address table 220 can be automatically updated or deleted according to a request from the user. As a communication protocol used between the contrast management server 700 and the multicast source address management server 600, for example, an existing communication protocol such as HTTPS having a security function for preventing the multicast source address table 220 from being illegally updated can be applied.

According to the invention, only by changing the function of a multicast router to which the end user terminal is directly connected, the end user terminal supporting only any-source multicast can join a source-specific multicast network. According to the invention, since a multicast router determines whether the end user joins or leaves multicast group, on the basis of a multicast network join or leave request from the end user terminal, it is able to stop the supply of the multicast traffic to the end user at the time when the end user does not need multicast traffic.

What is claimed is:

1. A packet forwarding apparatus to be coupled, via a multicast network, to a first client node that cannot designate a multicast source and a second client node that can designate a multicast source, comprising:

a translating unit configured to translate a first request of joining a multicast group to be joined which is sent from the first client node into a second request of joining the multicast group to be joined with designating a source of the multicast group to be joined, and further configured to translate a first request of leaving a multicast group to be left which is sent from the first client node into a second request of leaving the multicast group to be left with designating a source of the multicast group to be left; and a transfer unit configured to transfer to said multicast network the second request of joining the multicast group to be joined, and further configured to transfer to said multicast network the second request of leaving the multicast group to be left, wherein the transfer unit is configured such that, when the packet forwarding apparatus receives a third request of joining a multicast group from the second client node, the transfer unit transfers the third request without translation, wherein the packet forwarding apparatus determines whether the first request and the third request is translated or not based on whether the source of the first/third request can designate a multicast source, and wherein if source of the third request can designate a multicast source, the packet forwarding apparatus does not translate the third request.

2. The packet forwarding apparatus according to claim 1, wherein an address of the source of the multicast group to be joined and an address of the source of the multicast group to be left are determined respectively on the basis of an address of the first client node that sent the first request of joining and an address of the multicast group to be joined, and on the basis of the first client node that sent the request of leaving and an address of the multicast group to be left.

* * * * *